UNITED STATES PATENT OFFICE.

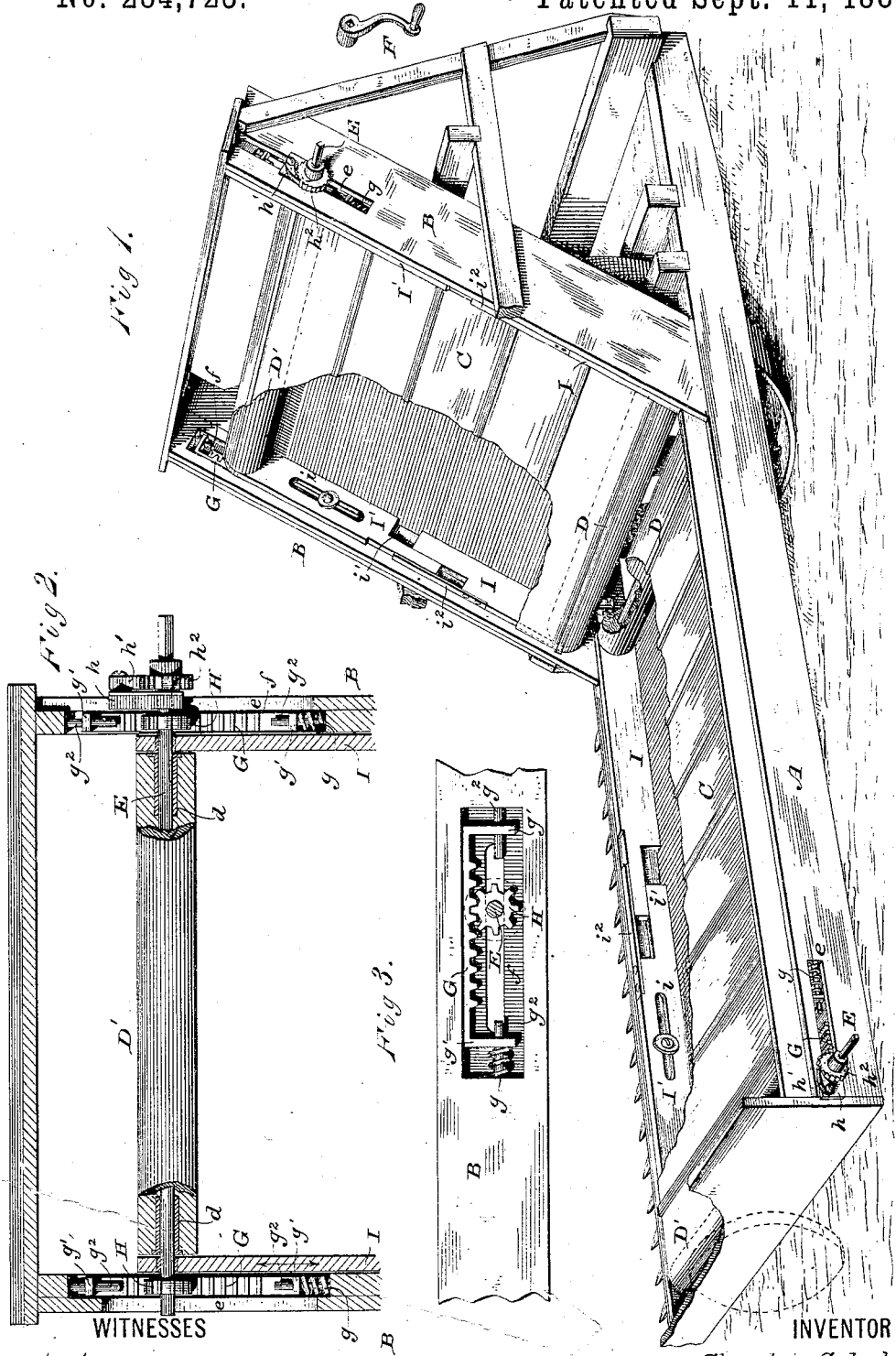

CHARLES COLAHAN, OF CLEVELAND, OHIO.

HARVESTER-RAKE.

SPECIFICATION forming part of Letters Patent No. 284,723, dated September 11, 1883.

Application filed April 16, 1883. (No model.)

*To all whom it may concern:*

Be it known that I, CHARLES COLAHAN, of Cleveland, in the county of Cuyahoga and State of Ohio, have invented certain new and useful Improvements in Harvester-Rakes, of which the following is a specification.

My invention relates to that class of rakes in which the grain as it is cut falls upon a moving surface composed of an endless carrier-apron supported upon drums or rollers at each end of the platform, and also to such aprons when used as conveying instrumentalities in any part of the harvester, or any other mechanism where it is necessary to move straw or material from one point to another; and it consists in mounting a drum or roller supporting one end of a carrier-apron to turn loosely upon a through rod or shaft capable of being independently rotated, and combining with said rod means whereby as it is thus independently rotated it is displaced laterally to carry the roller in the direction of the length of the apron and take up the slack of the latter; in combining with an endless carrier-apron a roller, upon which it is supported at one end, a through rod or shaft capable of being independently rotated, upon which said roller turns, pinions fixed to said shaft at each end within the longitudinal sills and meshing into racks sustained upon said sills, so that by rotating the shaft the drum or roller, while still revolving with the movement of the apron, will be displaced laterally to take up any slack in said apron, or to loosen it, as may be desired; in combining with an endless carrying-apron a roller, upon which it is supported at one end, a through rod or shaft capable of being independently rotated, upon which said roller turns, pinions fixed to said shaft at each end within the longitudinal bars or sills sustaining said apron and its rollers, racks supported by said bars, into which the pinions take, means for rotating said rod or shaft, to carry the roller along said racks and tighten or loosen the apron, and means for locking the rod in position against the stress of the apron; in combining with a carrier-apron and the roller, upon which it is supported at one end, a through rod or shaft upon which said roller turns loosely, pinions fixed to said rod at each end within the longitudinal bars or sills which support the apron and its carrying-rollers, racks supported upon said bars, with which said pinions engage, springs against which said racks bear as seats, to allow them a yielding movement, means for rotating said shaft independently of the drum or roller, to carry it along the racks to tighten or take up slack in the apron with an elastic pressure, and means for locking the shaft against rotation when it has reached the point at which such slack is sufficiently taken up; in combining with a carrier-apron and a drum or roller, upon which it is supported at one end, a through rod or shaft upon which said roller loosely turns, sliding bars on the inner face of the longitudinal sills or frame-bars, to serve as extension-guides for the edges of the apron and incidentally to steady the roller, pinions fast to said rod or shaft in recesses in the frame-bars outside of the sliding bars, racks supported within said recesses, with which the pinions engage, and means whereby said rod may be rotated independently of the revolutions of the roller, to carry said roller along the racks to adjust or tighten the belt; in the combination of a carrier-apron and a roller, upon which it is supported at one end, a through rod or shaft upon which said roller loosely turns, sliding bars through which said rod passes, lying along the inner face of the frame bars or stretchers which carry the apron and its rollers, pinions fixed to said rod within recesses in the frame-bars outside of the sliding bars, racks having a limited play within said recesses and spring-seated against the frame-bars, with which racks said pinions engage, means for rotating said rod independently of the apron-roller, to carry the roller along the racks and stretch the apron yieldingly, and a pawl or other locking device, to prevent retrograde motion of the rod whenever the apron has been properly adjusted; and in the various other combinations and details of construction hereinafter described and claimed.

In the drawings, Figure 1 is a perspective view of a harvester of the type known as "Marsh," embodying in the construction of its apron-carriers my improvement. Fig. 2 is a bottom plan view of a portion of a carrier-frame with the apron-roller in section. Fig. 3 is a detail of one of the pinions and spring-seated racks.

A is the platform-frame of a harvester of the above description, and B the elevator-frame; C, the aprons, one upon the platform and one between the elevator boards or struts in the usual manner; D, the fixed rolls upon which they turn respectively, and D' the movable rolls, which latter in such a machine I prefer to locate, one at the grain end of the platform-apron and the other at the head of the elevator-apron, so that the belts may have permanent relations at the angle between platform and elevator, and for the reason, also, that there is no liability under such construction of weakening the frame at a point where all possible strength is required by the incisions and removal of material which the adjusting devices necessitate, and which at the other point have no detrimental effect at all in that regard. The movable roller D' is mounted and turns loosely upon a through rod or journal-shaft, E, which passes through a longitudinal slot, $e$, in the rear sill or in the rear elevator-strut, and projects sufficiently therebeyond to receive a key or wrench, F, upon its squared end, whereby it may be turned independently of the roller.

In recesses $f$ in the sills or elevator-struts, opposite the ends of the movable roller, are placed equal racks G, with which engage equal pinions H, fixed to the journal-shaft at its corresponding ends. These racks may be rigidly secured to the sills or timbers by which they are supported; but I prefer, in order to allow the apron-roller to yield slightly at each end, thereby compensating for unequal stretch of the belt by any means, to seat them upon coiled springs $g$, resting against the timber at the proper end of the recess in which they are located, and for this purpose, and to steady them in the play to which they are subjected, their ends $g'$ are turned up, so as to span the width of the recesses and receive through them guide-rods $g^2$, projecting from the timbers, one at each end of the recess, and upon these guide-rods, and steadied by the sides and bottom of the recess, they play back and forth under constant spring-pressure. Now, supposing the journal-rod to be rotated by its wrench, or by a hand-wheel, if it has one, it will travel along these racks co-ordinately at each end, its pinions being equal and the racks also equal, and will carry the apron-roller along with it, forcing it positively if the racks are fixed, and yieldingly if they are spring-seated, thus taking up all slack in the belt. A block of metal, $h$, sleeved or journaled upon that end of the roller to which the wrench is applied, and traveling with it in the slot through the frame bar or sill as a guideway, bears upon a pivot just outside of the sill a pawl, $h'$, which takes into the teeth of a ratchet-disk, $h^2$, fast to the journal-shaft, and serves to prevent retrograde motion in a direction calculated to loosen the belt, being always ready to drop behind any tooth and check the shaft the instant it ceases to be rotated in the action of adjusting, thus stopping the pinions at whatever point along the racks they may happen to be, and in effect holding the rod locked in position at each end alike.

As so far described the construction is sufficient for the purpose of adjustment and for a carrier of short length or having but little weight to support. It is, however, more beneficial to support the edges of the apron, especially if its task is heavy; and in order to do this, and also to in a measure steady and brace the journal-rod and the roller, which it carries, sectional bars I I' are herein provided upon the inner face of each longitudinal sill or elevator-strut. Those bars, I, adjoining the stationary roller or rollers are fixed in position, while the bars I', passing alongside the ends of the movable rollers and receiving through themselves the spindle of the journal-shaft, are held to the sills or struts by means of headed pins or bolts passing through longitudinal slots $i$, whereby they are permitted to accompany the movable roller and its shaft in any adjustment. The meeting ends of the guide-sections are cut away and lapped, as at $i'$, to preserve their alignment, notwithstanding the play of the movable sections. A metallic clip, $i^2$, is attached to one or the other section at this point, to bridge the gap and preserve a substantially flush and unbroken surface for the apron-edge to travel upon.

The apron-rollers are universally made of wood turned true. As they are in the present construction required to turn upon a metallic through-rod, I propose to make their central bore somewhat greater in diameter than said rod, and insert at the ends brasses $d$, thus obtaining an entirely metallic bearing and greatly reducing the friction.

It is evident that since the co-ordinate adjustment of the roller along its length depends upon the fact that the journal-rod is compelled by its pinions and intermeshing racks to travel equally at each end, any other means which will insure by the rotation of said shaft its being laterally displaced in like manner may be substituted for said pinions and racks. It will therefore be within the scope of this invention if, instead of pinions and racks, bands or chains are provided, fixed at one end to a cross-timber or tie-piece of the frame, and at the other to the spindle of the journal-shaft or small pulleys thereon, and wound up or let out by said shaft as it revolves. Such construction is, however, less reliable and probably more expensive than that described above, and considered the preferable one.

It is obvious, also, that the shaft and pinions, and the racks with which said pinions engage, may be applied to the adjustment of the apron-roller when said shaft does not itself form the journals of the roller, and yet not depart from the broad principle of my invention—the transmission of the co-ordinate relative movement between racks and pinions at each end of the shaft when such shaft is rotated to the drum or roller—as, for instance, the roller may be journaled in the sliding bars and the racks attached to said bars fixedly or with interposed spring-seats, while the shaft is journaled in stationary bearings in the frame-bars on one side or the other of the roller; or both roller and shaft may be independently journaled in the sliding bars, while the racks are connected with the frame-bars.

I claim—

1. The combination, substantially as hereinbefore set forth, of a drum or roller supporting one end of a carrier-apron, a through rod or journal-shaft supporting loosely said roller, and capable of being independently rotated, and means whereby in such independent rotation of the shaft it is displaced laterally to carry the roller in the direction of the length of the apron and take up the slack of the latter.

2. The combination, substantially as hereinbefore set forth, of an endless carrier-apron, a drum or roller upon which it is supported at one end, a through rod or journal-shaft capable of being independently rotated, upon which said roller turns, and pinions fixed to said shaft at each end within the longitudinal sills, so that by rotating the shaft the drum, while still revolving with the movement of the apron, will be displaced laterally to take up slack.

3. The combination, substantially as hereinbefore set forth, of an endless carrier-apron, a roller upon which it is supported at one end, a through rod or journal-shaft capable of being independently rotated, upon which said roller turns, pinions fixed to said shaft at each end within the longitudinal bars or sills sustaining said apron and its rollers, racks supported by said bars, into which the pinions take, means for rotating said rod or shaft to carry the roller along said racks and tighten or loosen the apron, and means for locking the shaft in position against the stress of the apron.

4. The combination, substantially as hereinbefore set forth, of a carrier-apron, a roller upon which it is supported at one end, a through rod or journal-shaft upon which said roller turns loosely, pinions fixed to said shaft at each end within the longitudinal bars or sills, racks supported upon said bars, with which said pinions engage, elastic seats between said bars and racks to allow the latter a yielding movement, means for rotating the journal-shaft independently of the drum or roller, to carry it along the racks to tighten or take up slack in the apron with an elastic pressure, and means for locking the shaft against rotation when it has reached the point at which such slack is sufficiently taken up.

5. The combination, substantially as hereinbefore set forth, of a carrier-apron, a drum or roller upon which it is supported at one end, a through rod or shaft upon which said roller loosely turns, sliding bars on the inner face of the longitudinal sills or frame-bars, to serve as extension-guides for the edges of the apron and embracing said shaft, pinions fast to the shaft in recesses in the frame-bars outside of the sliding bars, racks supported within said recesses, with which the pinions engage, and means whereby said shaft may be rotated independently of the revolutions of the roller, to carry said roller along the racks to adjust or tighten the belt.

6. The combination, substantially as hereinbefore set forth, of a carrier-apron and a roller upon which it is supported at one end, a through rod or shaft upon which said roller loosely turns, sliding bars through which said shaft passes, lying along the inner face of the frame-bars or stretchers which carry the apron and its rollers, pinions fixed to said shaft within recesses in the frame-bars outside of the sliding bars, racks having a limited play within said recesses and spring-seated against the frame-bars, with which racks said pinions engage, means for rotating said shaft independently of the apron-roller, to carry the roller along the racks and stretch the apron yieldingly, and a pawl or other locking device to prevent retrograde motion of the rod whenever the apron has been properly adjusted.

7. The combination, substantially as hereinbefore set forth, of the platform-apron, the roller at the stubble end mounted in fixed bearings, the roller at the grain end mounted loosely upon an independently-rotatable through journal-shaft, and means whereby said shaft is caused to travel co-ordinately at each end as it is rotated.

8. The combination, substantially as hereinbefore set forth, of the elevator-apron, the roller at the base thereof mounted in fixed bearings, the roller at the head mounted loosely upon an independently-rotatable through journal-shaft, and means whereby said shaft is caused to travel co-ordinately at each end as it is rotated.

9. The combination, substantially as described, of the frame-bars, the shaft extending across the frame, the pinions fixed to said shaft, and the racks and their spring-seats.

10. The combination, substantially as hereinbefore set forth, of the apron-roller, the through journal-shaft, the pinions on said shaft, the racks within recesses in the frame-bars, the guide-pins for said racks, and the coiled spring-seat encircling one of said guide-pins for each rack.

11. The combination, substantially as before set forth, of the apron-roller, the shaft and pinions, the racks, a ratchet-disk upon the shaft, a block or carriage sleeved to said shaft and guided by the slot in the frame-bar, and a pawl pivoted to said block and engaging with the ratchet.

CHAS. COLAHAN.

Witnesses:
GEO. U. WALKER,
JNO. J. WALKER.